US008517826B1

(12) United States Patent
Hafezi

(10) Patent No.: US 8,517,826 B1
(45) Date of Patent: Aug. 27, 2013

(54) METHOD AND APPARATUS FOR ALLOWING USER DETERMINED GAMING CONFIGURATION

(75) Inventor: Jonathan Hafezi, Charlotte, NC (US)

(73) Assignee: Isdgames, Inc., Charlotte, NC (US)

( * ) Notice: Subject to any disclaimer, the term of this patent is extended or adjusted under 35 U.S.C. 154(b) by 0 days.

(21) Appl. No.: 13/545,223

(22) Filed: Jul. 10, 2012

Related U.S. Application Data

(63) Continuation-in-part of application No. 13/420,350, filed on Mar. 14, 2012, and a continuation-in-part of application No. 13/420,377, filed on Mar. 14, 2012, and a continuation-in-part of application No. 13/453,756, filed on Apr. 23, 2012.

(51) Int. Cl.
*A63F 9/24* (2006.01)
*A63F 13/00* (2006.01)

(52) U.S. Cl.
USPC .................. 463/25; 463/11; 463/16; 463/29; 273/292

(58) Field of Classification Search
USPC .......... 463/11-13, 16-20, 25, 29-31, 40-42; 273/274, 292
See application file for complete search history.

(56) References Cited

U.S. PATENT DOCUMENTS

| | | | | |
|---|---|---|---|---|
| 5,046,736 | A * | 9/1991 | Bridgeman et al. | 463/13 |
| 5,657,993 | A * | 8/1997 | Merlino et al. | 273/292 |
| 6,659,461 | B2 * | 12/2003 | Yoseloff et al. | 273/274 |
| 7,699,695 | B2 * | 4/2010 | White et al. | 463/13 |
| 2006/0025221 | A1 * | 2/2006 | Jain et al. | 463/42 |
| 2006/0058087 | A1 * | 3/2006 | White et al. | 463/11 |
| 2007/0213116 | A1 * | 9/2007 | Crawford et al. | 463/16 |
| 2007/0265050 | A1 * | 11/2007 | Baazov | 463/13 |
| 2008/0026826 | A1 * | 1/2008 | Groswirt | 463/25 |

* cited by examiner

*Primary Examiner* — Milap Shah
(74) *Attorney, Agent, or Firm* — Thibault Patent Group

(57) ABSTRACT

Methods and apparatus are described relating to enabling customized gaming to game players. In one embodiment, a method is described, comprising providing a selection of two or more rake options to a first game player via a first gaming terminal, receiving an indication of a selected rake option from the two or more rake options for use during the course of game play by the first game player, and deducting a fee from an account balance associated with the first game player in accordance with the rake option selected by the first game player.

28 Claims, 10 Drawing Sheets

METHOD AND APPARATUS FOR ALLOWING USER DETERMINED GAMING CONFIGURATION

CLAIM OF PRIORITY

This application is a continuation-in-part of, and claims priority to, U.S. patent application Ser. No. 13/420,350 and to U.S. patent application Ser. No. 13/420,377, both filed on Mar. 14, 2012, and to U.S. patent application Ser. No. 13/453,756 filed on Apr. 23, 2012, all owned by the inventor of the present application and incorporated by reference in their entirety herein.

BACKGROUND

I. Field of Use

The present application relates generally to gaming devices and systems, and more specifically to gaming devices interconnected by a network for playing interactive multi-player games.

II. Description of the Related Art

Casino gaming has been popular for many years in places such as Las Vegas, Atlantic City, Macao, and many others. However, it has also gained widespread acceptance and may now be found in virtually every state in the United States, mainly in the form of Indian casinos and card rooms. Often, these authorized gaming establishments offer electronic card games such as video poker games for single player use.

More recently, gaming establishments have been offering server-based gaming to their patrons. In a server-based gaming system, multiple player terminals are networked to a central server that typically allows a variety of games to be played on the player terminals. Win/lose determination is typically provided by the server, rather than at each gaming terminal, thereby minimizing the hardware and security requirements in each gaming terminal. The server may offer "single-player" games, such as traditional video poker, blackjack, craps, or slots, where a player's results are determined solely by a Random Number Generator (RNG), either at the server or the player terminals, the RNG generating game values such as electronic cards, dice, or slot reels. The server may also offer games that allow patrons to play against each other, such as Texas Hold 'Em, draw poker, stud poker, etc. since the gaming terminals are all networked to the gaming server.

In some server-based systems, a "rake", "fee", "house cut", or a scaled commission may apply to some games, typically poker. The rake is a fee that is paid to the "house" or authorized gaming establishment, typically for each round of game play. It is usually based on a percentage of the "pot" as game play progresses, typically capped at a predetermined dollar amount for each round of play. However, other ways to determine this "house cut" may be implemented, such as a fixed fee per round or a method based on individual wagers placed during game play. Each of the players must abide by the rake system as defined by each casino.

The rigid rake system described above may not appeal to some potential game players. Some players may think the rake system in a given casino unfairly benefits the casino at the expense of players. Potential players, therefore, may patronize casinos where they believe the rake system to be more advantageous. Thus, it would be desirable to offer a more flexible rake system to players in order to increase player retention and also to attract potential game players to casino offering such a flexible rake system.

SUMMARY

The embodiments described herein relate to a method, system, and apparatus for enabling customized gaming to game players. In one embodiment, a method is described, comprising providing a selection of two or more rake options to a first game player via a first gaming terminal, receiving an indication of a selected rake option from the two or more rake options for use during the course of game play by the first game player, and deducting a fee from an account balance associated with the first game player in accordance with the rake option selected by the first game player.

In another embodiment, a server is described for enabling customized gaming to game players using gaming terminals, comprising a network interface for receiving rake option selections from gaming terminals, a memory for storing information related to two or more rake options and for storing processor-executable instructions, a processor connected to the network interface and the memory for executing the processor-executable instructions that cause the server to receive a first rake option selection from a first gaming terminal, and deduct a first fee from an account balance associated with a first player operating the first gaming terminal in accordance with the first rake option selection.

In yet another embodiment, a gaming terminal is described for enabling customized gaming to game players using the gaming terminal, comprising a memory for storing processor-executable instructions and for storing two or more rake options, a user interface for providing information to the first game player and for receiving indications from the first game player, and a processor coupled to the memory and the user interface for executing the processor-executable instructions that cause the apparatus to provide the two or more rake options to the user interface, receive an indication of a selected rake option from the two or more rake options for use during the course of game play by the first game player, and deduct a fee from an account balance of the first player in accordance with the rake option selected by the first game player.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present disclosure relates to networked gaming systems. More specifically, various embodiments of a method, system, and apparatus are disclosed for allowing players using a networked gaming system to customize at least some aspect of a selected game available via the networked gaming system. For example, various embodiments are disclosed for allowing game players to select a particular rake type from two or more rake options provided by either a gaming terminal, local gaming server, central gaming server, or a combination of these.

The term "live-play" refers to real time or near real-time game play among/between human beings, each operating a respective gaming terminal.

The term "authorized gaming establishment" refers to herein as any place of business that has been authorized by any local, state, federal, or other governmental body, to provide gaming services to individuals. Such establishments may include traditional casinos, Indian casinos, bingo parlors, card rooms, racetracks, riverboats, bars, airports, restaurants, and virtually any other establishment that is authorized to provide gaming to its customers.

Figure 1:
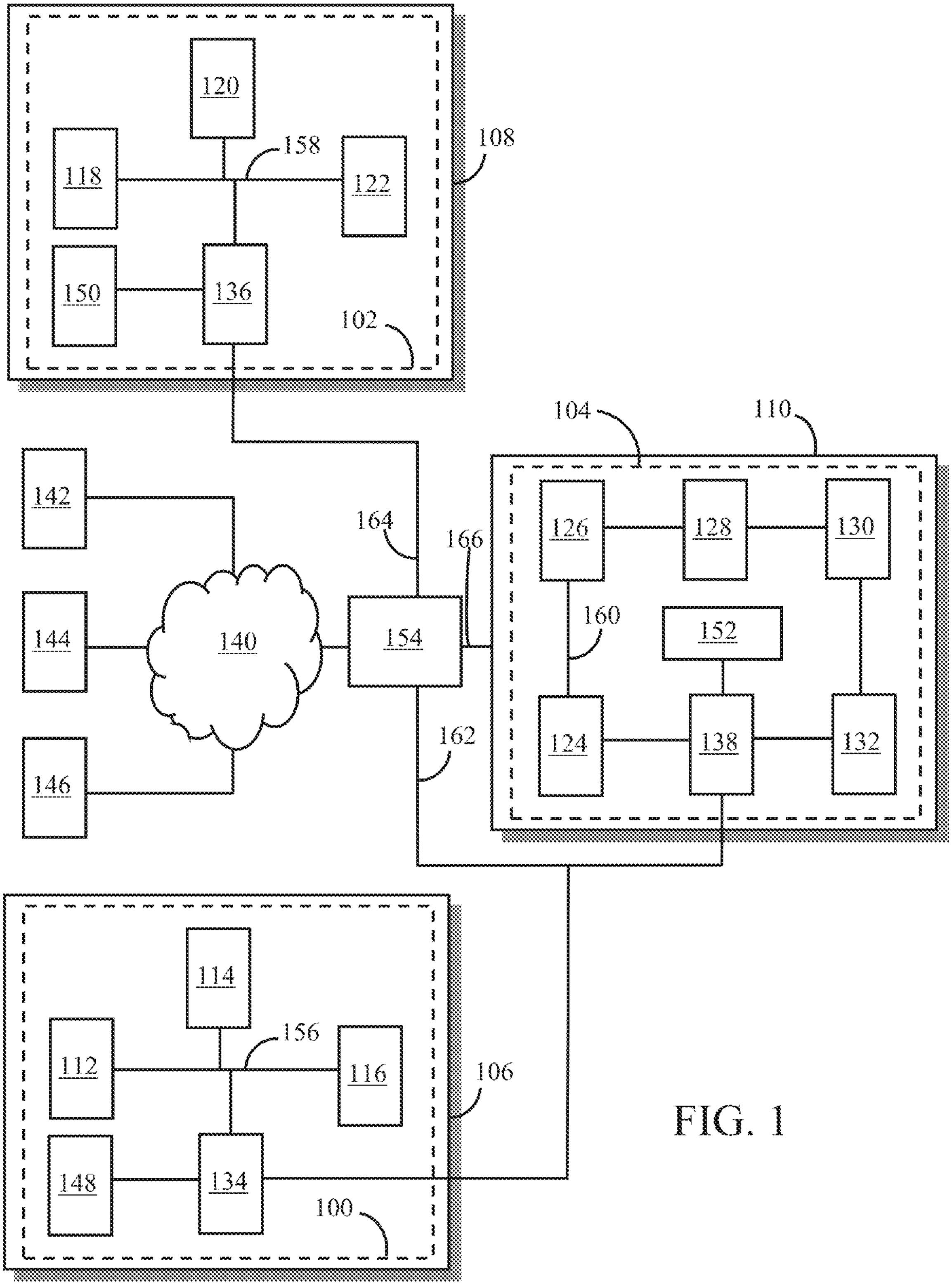
FIG. 1 illustrates a networked gaming system in accordance with the teachings herein, used by single or multiple authorized gaming establishments.

FIG. 1 illustrates networked gaming systems 100, 102, and 104, each located on the premises of authorized gaming establishments 106, 108, and 110, respectively. In one embodiment, these gaming systems operate independently from one another. In another embodiment, these gaming systems are inter-related to each other via server 154, as explained in greater details below. It should be understood that in other embodiments, a greater or fewer number of authorized gaming establishments could be used, more than one networked gaming system could be located within a single authorized gaming establishment, and other variations regarding the number and placement of networked gaming systems and/or authorized gaming establishments.

Each authorized gaming system shown in FIG. 1 comprises a server 134, 136, and 138, respectively, along with one or more gaming terminals networked to a respective gaming server 134, 136, or 138, as the case may be. Shown in FIG. 1 are gaming terminals 112, 114, and 116 located on the premises of authorized gaming establishment 106, gaming terminals 118, 120, and 122 located on the premises of authorized gaming establishment 108, and gaming terminals 124, 126, 128, 130, and 132 located on the premises of authorized gaming establishment 110. Each of the gaming terminals allows an individual to participate in one or more games of chance and/or skill, either against other individuals using any of the other gaming terminals, against "the house", e.g., authorized gaming establishment, or a combination of both. Such gaming terminals may allow an individual to play games such as poker (in any number of its forms), roulette, craps, bingo, keno, slots, blackjack, and other games of chance and/or skill. Although FIG. 1 illustrates a particular number of gaming terminals associated with each networked gaming system, it should be understood that in other embodiments, a greater or fewer number of gaming terminals may be used in association with each networked gaming system.

As mentioned above, each networked gaming system 106, 108, and 110 additionally comprises a server 134, 136, and 138, respectively, that are networked to their respective gaming terminals via communication medium 156, 158, and 160, respectively. The communication medium may comprise air (in the case of wireless networking), electrical or fiber optic cable, or any other well-known way to allow communications between/among servers and their respective gaming terminals. Each of the networked gaming system may use the same, or different, communication medium than other networked gaming systems. The servers communicate with their respective gaming terminals over their respective communication mediums, typically using well-known digital communication protocols such as TCP/IP, RS-232, or other digital communication protocols well known in the art.

Each server performs a variety of tasks necessary for game play between and among individuals at different gaming terminals. Although each of the servers 134, 136, and 138 are shown co-located with their respective gaming terminals, they could be located at a different location than their respective gaming devices, for example, in another jurisdiction, connected to their respective gaming terminals via the Internet.

Each networked gaming system 100, 102, and/or 104 may additionally comprise a slot club card server, the slot club card server for tracking player playing characteristics, such as the amount of time a player plays a particular game, a total amount that a player has wagered in a given time frame, an average number of wagers, an average wager size, a number of times that a player has "gone all in", and other characteristics. Such slot club card servers are well known in the art and are shown in FIG. 1 as slot club card servers 148, 150, and 152.

Players typically register with the slot club card server in each authorized gaming establishment that they wish to play in. In return, they are typically given a "player's card" in return. The player's card may then be inserted by the player into a selected gaming terminal prior to game play. The slot club card server receives an indication that the player has begun operating the gaming terminal, and the slot club card server may then be provided information pertaining to time played, wagers placed, etc. This information is stored in an electronic memory inside the slot club card server and may be analyzed by the authorized gaming establishment for marketing purposes, for general business purposes, for offering players rewards or "comps", or other purposes.

Often, an award is given to players whose characteristics meet a predetermined minimum criterion. For example, players who play 10 hours of total game play at any one of the gaming terminals within authorized gaming establishment 106 may receive a free buffet dinner or overnight stay in a hotel room.

As mentioned above, in one embodiment, each networked gaming system typically operates independently from one another. For example, individuals playing games on gaming terminals 112, 114, and/or 116 may only play against each other and not against individuals playing games on gaming terminals located at authorized gaming establishments 108 and 110.

In another embodiment, individuals from one authorized gaming establishment may play games against individuals in other authorized gaming establishments via server 154 and communication channels 162, 164, and 166. Server 154 performs a variety of tasks necessary for game play between and among individuals at different gaming terminals located at different authorized gaming establishments. For example, server 154 may allow an individual to play live Texas Hold 'Em poker at gaming terminal 116 against individuals at gaming terminals 118, 122, 124, and 132, respectively.

In yet another embodiment, individuals from one authorized gaming establishment may play games against individuals located remotely from any authorized gaming establishment, via server 154 connected to a wide area network, shown in FIG. 1 as Internet 140. In this embodiment, the gaming terminal may comprise a personal computing device 142, 144, and/or 146 (e.g., a home computer, tablet device, smartphone, etc.) connected to Internet 140 to play games of chance and/or skill with individuals located at gaming terminals inside authorized gaming establishment 106, 108, and/or 110. Server 154 performs a variety of tasks necessary for game play between and among individuals at different the various gaming terminals and personal computing devices.

In the case of where gaming terminals comprise personal computing devices 142, 144, and/or 146, two or more rake options are provided to the personal computing devices, either embedded in executable code downloaded to the personal computing devices prior to game play or during game play as the personal computing devices interact with server 154 over network 140. A player of one of the personal computing devices selects one rake option from the two or more rake options, where an indication of the player's selection is provided to server 154 and/or to an authentication server. As game play progresses, a rake fee is subtracted from an account balance associated with the game player in accordance with the rake option selected by the game player.

Figure 2:
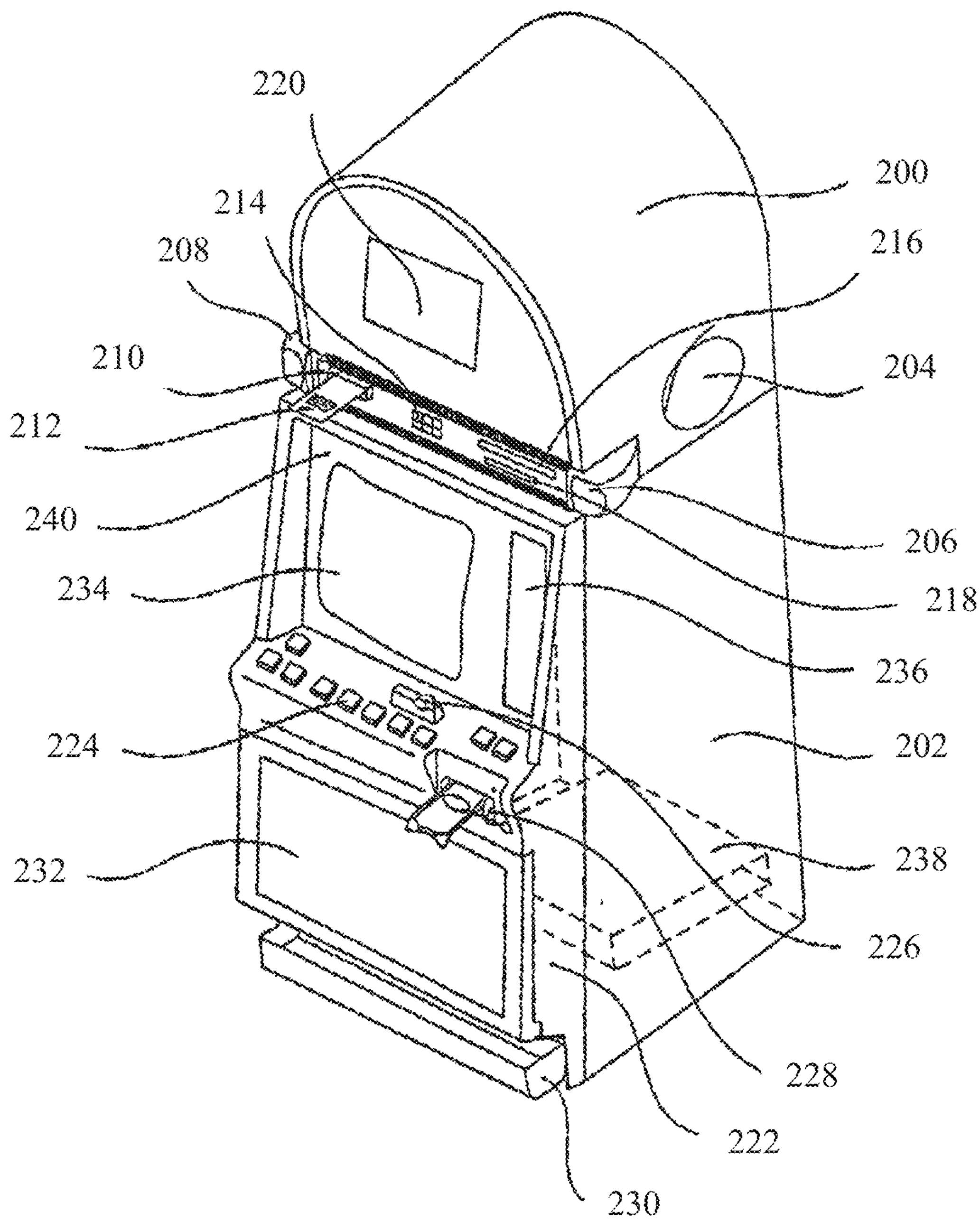
FIG. 2 shows a perspective view of one embodiment of one of the gaming terminals shown in FIG. 1.

FIG. 2 shows a perspective view of one embodiment of one of the gaming terminals shown in FIG. 1, in this example gaming terminal 116, otherwise known as a slot machine, slot device, user terminal, player terminal, video slot machine, or other nomenclature. It should be understood that although gaming terminal 116 is shown in FIG. 2 as a slot machine, this is not meant to be a limiting configuration. In other words, gaming terminal 116 may, alternatively, take the form of a fixed or mobile computer, tablet, "table-top" gaming device, smartphone, or virtually any other electronic device capable of networking with server 154. In the case of a mobile device, it would be desirable if a location of the device could be ascertained, at a single point in time or periodically as games are being played, so that the device may be associated with a particular authorized gaming establishment. For example, a player may wish to use the player's iPad, manufactured by Apple Incorporated of Cupertino, Calif., to participate in live game play using the system shown in FIG. 1. In this case, the player may be required to access network 156 and/or 162 via a Wi-Fi connection to a wireless router operated by authorized gaming establishment 106. In another embodiment, a location of the player's mobile device could be ascertained using one or more available positioning technology, such as GPS or mulitlateration, and the position provided to server 154 so that an association between that device and authorized gaming establishment 106 may be established.

Referring now back to FIG. 2, in this embodiment, gaming terminal 116 comprises a device meeting the standards set by the Regulations of the Nevada Gaming Commission in, for example, "Technical Standards for Gaming Devices and On-Line Slot Systems". Such standards regulate odds, payoff amounts, currency exchange, random number generation, and technical specifications relating to fraud detection and prevention. It may be advantageous to allow live game play via such player terminals because they are manufactured within the aforementioned standards and, thus, retain a degree of similarity between different games and devices. For example, gaming terminals manufactured to such standards typically comprise large, lit buttons for players to easily interact with the device.

As illustrated in the example of FIG. 2, gaming terminal 116 includes a main cabinet 202, which generally surrounds the gaming terminal interior and is viewable by players. The main cabinet may include a main door 222 on the front of the machine, which opens to provide access to the interior of gaming terminal 116. Attached to the main door are player-input switches or buttons 224, a coin acceptor 226, and a bill validator 228, a coin tray 230, and a belly glass 232. Viewable through the main door is a video display monitor 234 and an information panel 236. The display monitor 234 will typically be a cathode ray tube, high resolution flat-panel LCD, or other conventional electronically controlled video monitor. The information panel 236 may be a back-lit, silk screened glass panel with lettering to indicate general game information including, for example, a game denomination (e.g. $0.25 or $1). The bill validator 228, player-input switches 224, video display monitor 34, and information panel are devices used to play a game on the gaming terminal 116.

According to a specific embodiment, gaming terminal 116 may be controlled by processor-executable code executed by a processor located on or in master gaming controller 238 housed inside the main cabinet 202 of gaming terminal 116. The hardware and software associated with the master gaming controller 238 may be distributed throughout the cabinet 202 and is not limited to the specific location illustrated in the FIG. 2.

Many different types of games, including mechanical slot games, video slot games, video poker, video black jack, video pachinko and lottery, may be provided with gaming machines of this invention. In particular, gaming terminal 116 may be operable to provide a play of many different instances of games of chance and/or skill. The instances may be differentiated according to themes, sounds, graphics, type of game (e.g., slot game vs. card game), denomination, number of paylines, maximum jackpot, progressive or non-progressive, bonus games, etc. The gaming terminal 116 may be operable to allow a player to select a game to play from a plurality of instances available on the gaming machine. For example, the gaming machine may provide a menu with a list of the instances of games that are available for play on gaming terminal 116 and a player may be able to select from the list a first instance of a game that they wish to play.

The various instances of games available for play on gaming terminal 116 may be stored as game software on a mass storage device in gaming terminal 116 or may be generated by, or hosted by, server 134, 136, 138, and/or server 154 and displayed on gaming terminal 116. The gaming terminal 116 may execute game software, such as but not limited to video streaming software that allows the game to be displayed on gaming terminal 116. When game software is stored on gaming terminal 116, it may be loaded from the mass storage device into an electronic memory, e.g. RAM, for execution by the processor. In some cases, after a selection of a particular game, the game software related to the game may be downloaded from one of the servers 134, 136, 138, and/or server 154, or it may be even downloaded from another player interface.

As illustrated in the example of FIG. 2, gaming terminal 116 includes a top box 200, which sits on top of the main cabinet 202. The top box 200 houses a number of devices, which may be used to add features to a game being played on gaming terminal 116, including speakers 204, 206, 208, a ticket printer 210 which prints bar-coded tickets 212, a key pad 214 for entering player tracking information, a florescent display 216 for displaying player tracking information, a card reader 218 for entering a magnetic striped card containing player tracking information, and a video display screen 220. The ticket printer 210 may be used to print tickets for a cashless ticketing system. Further, the top box 200 may house different or additional devices not illustrated in FIG. 2. For example, the top box may include a bonus wheel or a back-lit silk screened panel, which may be used to add bonus features to the game being played on gaming terminal 116. As another example, the top box may include a display for a progressive jackpot offered on the gaming machine. During a game, these devices are controlled and powered, in part, by circuitry (e.g. a master gaming controller) housed within the main cabinet 202 of the gaming terminal 116.

In one embodiment, gaming terminal 116 provides an indication of a status of live-game play. For example, video display screen 220 may display an image indicating which games have an opening for a player to participate and/or a subset of games having an open position. In another embodiment, video display screen 220 may display an image indicating that a new table has opened for game play. For instance, in a networked gaming system comprising gaming device 116 belongs and 100 other gaming terminals in communication with server 134, server 134 may, in this example, offer 4 types of games available for live-play: $2/4 Texas Hold 'Em, $3/$6 Texas Hold 'Em, Blackjack with a $25 minimum bet, and Blackjack with a $50 minimum bet. Each of the two Texas Hold 'Em virtual tables may accommodate 9 players, while each of the Blackjack virtual tables may accommodate 7 players playing against a house entity. If all of the available positions for all four virtual tables are "occupied" by players, video display screen 220 may display a message indicating so. However, if one of the players participating in the $3/$6 Hold 'Em virtual table terminates game play, video display screen 220 may display a message, icon, or other visual indication that a "seat" has become available on the $3/$6 virtual Texas Hold 'Em table. Similarly, if one of the players participating in the $50 Blackjack table terminates game play, the video display screen may display a message, icon, or other visual indication that a "seat" has become available on the $50 Blackjack table. In any case, information pertaining to available positions on any of the games offered by gaming terminal 116 and/or server 134 and/or server 154 is generally determined by either server 134 and/or server 154, as the case may be, and provided to gaming terminal 116 via communication medium 156 and/or communication medium 162.

It will be appreciated that gaming terminal 116 is just one example from a wide range of gaming machine designs on which the embodiments discussed herein may be implemented. For example, not all suitable gaming machines have top boxes or player tracking features. Further, some gaming machines have only a single game display—mechanical or video, while others are designed for bar tables and have displays that face upwards. As another example, a game may be generated by, and executed on, a one or more servers 134, 136, 138, and/or server 154 and may be displayed on gaming terminal 116.

Some player interfaces shown in FIG. 1 are implemented with special features and/or additional circuitry that differentiates them from general-purpose computers (e.g., desktop PC's and laptops). Gaming terminals are highly regulated to ensure fairness and, in many cases, gaming terminals are operable to dispense monetary awards of multiple millions of dollars. Therefore, to satisfy security and regulatory requirements in a gaming environment, hardware and software architectures may be implemented in gaming terminals that differ significantly from those of general-purpose computers.

Figure 3:
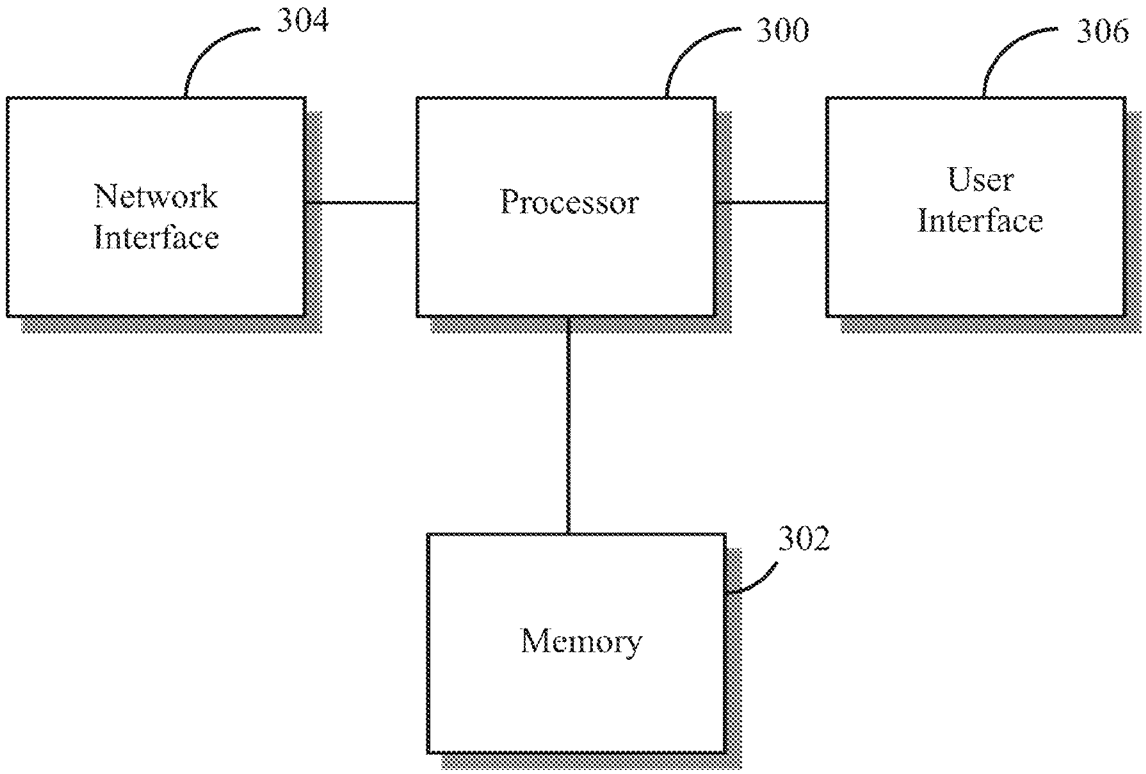
FIG. 3 is a functional block diagram of one embodiment of one of the servers shown in FIG. 1.

FIG. 3 illustrates a functional block diagram of one embodiment of server 134, 136, and/or 138 shown in FIG. 1. These servers each comprise a processor 300, a memory 302, a network interface 304, and a user interface 306. The sever may comprise a computer, application server, web server, or other electronic device that provides functionality for game play between and among players of the gaming terminals and/or personal computing devices shown in FIG. 1, including generating a virtual playing environment typically comprising a virtual gaming table, play management, wagering management, etc. For example, the servers may each provide an electronic version of poker, blackjack, craps, roulette, and/or other game of chance and/or skill to remote players using gaming terminals operated by the players. The games are typically processed within each server, i.e., random number generation used to provide game values to players (such as card values, dice values, etc.), providing the game values to players, win determination, wager management, etc.

Processor 300 comprises a general-purpose microprocessor well known in the art or it may comprise a custom or semi-custom ASIC able to carry out the functionality required for game play. Processor 300 generally executes processor-executable instructions stored in one or more mediums, such as memory 302, that control most or all of the functionality of the server. Examples of memory 302 include one or more electronic memories such as RAM, ROM, hard drives, flash memory, EEPROMs, EPROMs, Solid State Drive (s), etc. Network interface 304 comprises hardware and/or software configured to receive and process electronic communications from gaming terminals and personal computing devices connected to one or more communication networks, such as the Internet, a fiber optic network, a radio network, a wired or wireless telephone network, a satellite network, a wired or wireless data network, and/or any other well-known, two-way communication networks.

Processor-executable instructions are stored in memory 302 that, when executed by processor 300, allow players to customize one or more game configurations. In one embodiment, the processor-executable instructions cause the server to provide two or more rake options to a game player operating one of the gaming terminals, allowing the player to select one of the rake options. When one of the rake options is selected, an indication is sent from the gaming terminal to the server via network interface 304, where it is received by processor 300. The selected rake option is then used to deduct the rake from the first player's "stack", or balance, in accordance with the rake selected by the first game player, as the game is played.

User interface 306 generally comprises hardware and/or software necessary for allowing a user of the server, such as an authorized technician or operator, to perform various duties related to the maintenance and upkeep of the server. Such duties may include entering information pertinent to the location of various gaming terminals distributed within an authorized gaming establishment, updating software, performing trouble-shooting activities, accessing past game-play data, accessing player accounts, and so on. User interface 306 may comprise a keyboard, keypad, push-buttons, switches, a video display, a touch-screen device, a card reader, a microphone, an image capture device such as a still camera or video camera, a speaker, an RS-232 port, a USB port, a card reader, a network port, and/or virtually any other device that allows a user of the server to communicate with the server.

Figure 4:
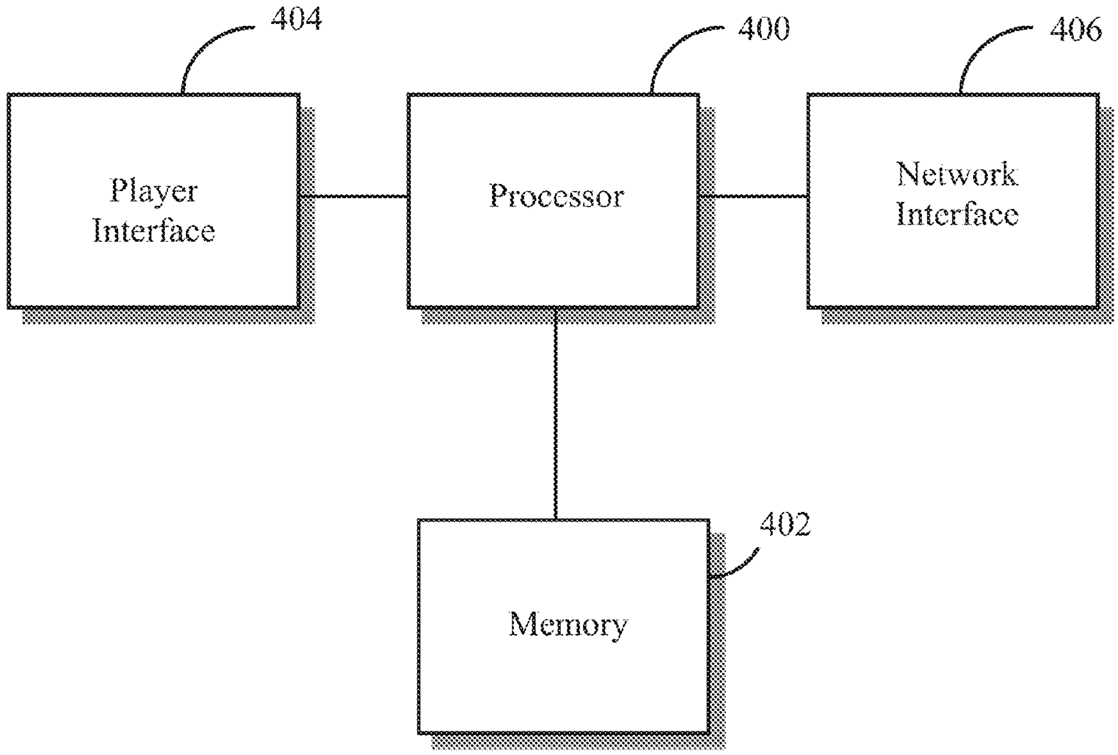
FIG. 4 illustrates a functional block diagram of one embodiment of the gaming terminal shown in FIG. 2.

FIG. 4 is a functional block diagram of one embodiment of the gaming terminal shown in FIG. 2, for example, gaming terminal 116. Shown are processor 400, memory 402, player interface 404, and network interface 406. It should be understood that in some embodiments, not all of the functional blocks shown in FIG. 4 are necessary for the proper operation of gaming terminals and that some functionality has been omitted for purposes of clarity.

Player interface 404 generally comprises hardware and/or software necessary for allowing a player of gaming terminal 116 to play games of chance and/or skill either against other players at different gaming terminals, against one or more computer-generated opponents managed by server 134 and/or server 154, or simply against "the house", i.e., against gaming terminal 400 as in blackjack, draw poker, etc. Player interface 404, as described above in the description relating to FIG. 2, may comprise a keyboard, keypad, push-buttons, switches, a video display, a touch-screen device, a card reader, a microphone, an image capture device such as a still camera or video camera, a coin and/or bill acceptor, a speaker, a ticket printer, an RS-232 port, a USB port, a network port, a card reader, and/or virtually any other device that allows a player of the gaming terminal to communicate, or interact, with the gaming terminal. A player of gaming terminal 116 uses player interface 404 to enter player selections and receive information pertaining to a game that the player has selected. Information may include graphic representation of cards, dice, Bingo balls, or other objects of gaming, the status of a game in progress, previous game results, odds for a particular event occurring, a player account balance, a number of "reward points" earned by the player, still or video images of other players, audio from other players or a dealer, and any other information pertaining to game play.

Processor 400 comprises a general-purpose microprocessor well known in the art or it may comprise a custom or semi-custom ASIC able to carry out the functionality required for allowing a player of gaming terminal 400 to play games. Processor 400 generally executes processor-readable, or processor-executable, instructions stored in one or more mediums, such as memory 402, that control most or all of the functionality of gaming terminal 116. Examples of memory 402 comprise one or more electronic memories such as RAM, ROM, hard drives, flash memory, EEPROMs, EPROMs, etc. Network interface 406 comprises hardware and/or software configured to send and receive electronic communications between gaming terminal 116 and other networked devices, such as any of the gaming terminals, servers, and/or personal computing devices shown in FIG. 1. Network interface may comprise circuitry necessary to process the electronic communications and may be designed specifically to communicate in a predetermined communication protocol, such as TCP/IP, RS-232, or other well-known form of digital communication protocols. Each of gaming terminal, server, and/or personal computing device may be interconnected with each other by one or more communication networks, such as the Internet, a fiber optic network, a radio network, a wired or wireless telephone network, a satellite network, a wired or wireless data network, and/or any other well-known, two-way communication network.

Typically, user interface 404 comprises a display device for displaying an electronic representation of one or more games available to potential game players. An individual may begin game play by selecting one of the games offered on the display, typically by touching an icon on the display representative of the one of the games. The player may further be given an opportunity to select options associated with the game. For example, if the game selected is Texas Hold 'Em, the player may be shown a list of active and/or pending Texas Hold 'Em games being played by other players networked to the gaming server. The player may select one of the pending games, for example, having betting limits suitable to the player. After a particular game has been selected, the player may then be presented with two or more rake options prior to game play. For example, one rake option may comprise a predetermined fee that is deducted from the first game player's balance at predetermined game intervals, such as before and/or after the "flop", before and/or after the "turn", and/or before and/or after the "river". A second rake option may comprise a predetermined fee that is deducted from the player's balance prior to the start of game play or each round of game play. For example, a twenty-five cent rake may be deducted from the player's balance prior to the start of each game of Texas Hold 'Em. Another possible rake option comprises a percentage of the player's wagers placed during the game. In this embodiment, for example, each time the player places a wager, a fixed or variable percentage is deducted from the player's balance as a rake. The maximum rake for each round of play may be limited to a predetermined amount and the percentage of rake may be varied depending on a number of factors, such as pot size, past wagering activity, the betting point in the game (for example, after the flop, before the river, etc.), time of day, and/or other factors. The player selects the type of rake via user interface 404, where an indication of the player's selection is typically provided to the gaming server and to processor 400. Thereafter, either the server or the gaming terminal deducts future rake fees from the player's balance for each round of game play following the player's selection and, typically, report each deduction to the server.

Figure 5:
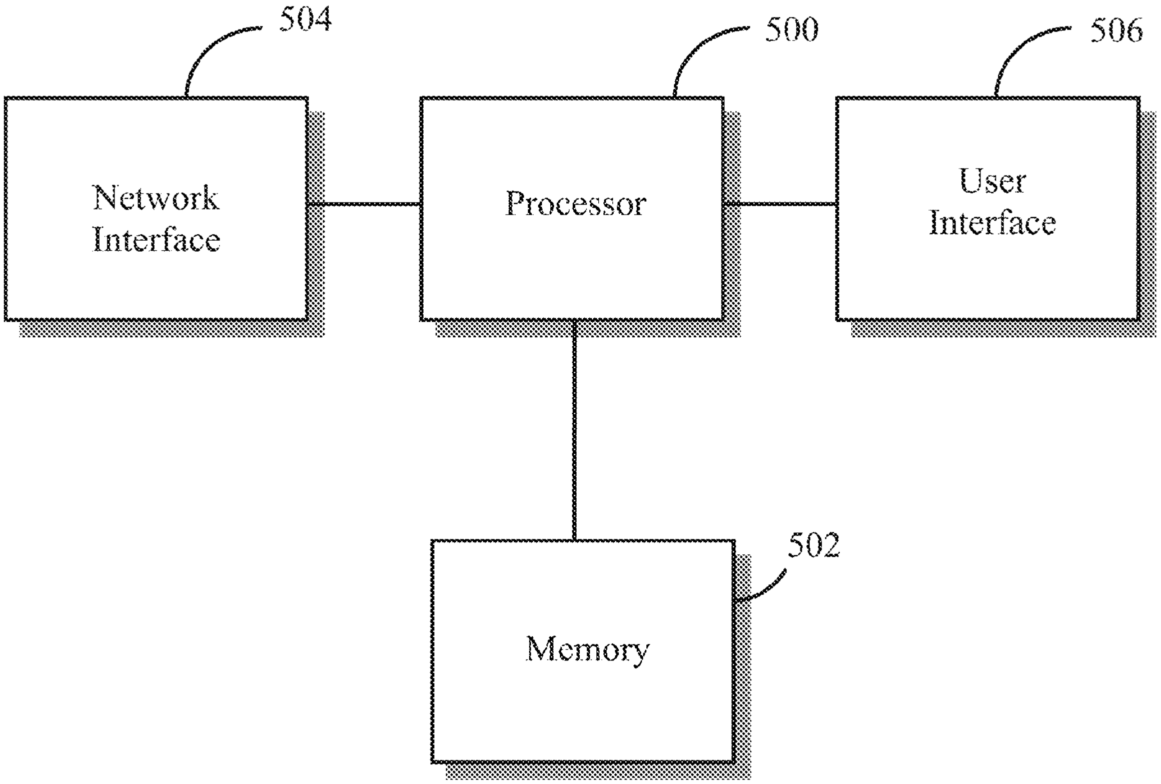
FIG. 5 illustrates a functional block diagram of one embodiment of central server 154 shown in FIG. 1.

FIG. 5 illustrates a functional block diagram of one embodiment of the server 154 shown in FIG. 1. Server 154 allows players located in different authorized gaming establishments and over the Internet to play games of chance and/or skill against and/or with one another in real-time or near real-time, each using a respective one of the gaming terminals shown in FIG. 1.

Server 154 comprises a processor 500, a memory 502, a network interface 504, and a user interface 506. Server 154 may comprise a computer, application server, web server, or other electronic computing device that provides functionality for game play between and among players of the gaming terminals and/or personal computing devices shown in FIG. 1, including generating a virtual playing environment typically comprising a virtual gaming table, play management, wagering management, accounting and accounting reconciliation between authorized locations, etc. Processor 500 comprises a general-purpose microprocessor well known in the art or it may comprise a custom or semi-custom ASIC able to carry out the functionality required for game play. Processor 500 generally executes processor-executable instructions stored in one or more mediums, such as memory 502, that control most or all of the functionality of server 154. Examples of memory 502 include one or more electronic memories such as RAM, ROM, hard drives, flash memory, EEPROMs, EPROMs, Solid State Drives. etc. Network interface 504 comprises hardware and/or software configured to receive and process electronic communications from gaming terminals and personal computing devices connected to one or more communication networks, such as the Internet, a fiber optic network, a radio network, a wired or wireless telephone network, a satellite network, a wired or wireless data network, and/or any other well-known, two-way communication networks.

User interface 506 generally comprises hardware and/or software necessary for allowing a user of server 154, such as an authorized technician or operator, to perform various duties related to the maintenance and upkeep of server 154.

Such duties may include entering information pertinent to the location of various gaming terminals distributed within an authorized gaming establishment, updating software, performing trouble-shooting activities, accessing past game-play data, accessing player accounts, and so on. User interface 506 may comprise a keyboard, keypad, push-buttons, switches, a video display, a touch-screen device, a card reader, a microphone, an image capture device such as a still camera or video camera, a speaker, an RS-232 port, a USB port, a card reader, a network port, and/or virtually any other device that allows a user of server 154 to communicate with server 154.

Processor-executable instructions are stored in memory 502 that, when executed by processor 500, allow players to customize one or more game configurations. In one embodiment, the processor-executable instructions cause the server 154 to provide two or more rake options to one or more game players operating one or more of the gaming terminals, respectively, allowing the players to select one of the rake options. When one of the rake options is selected, in one embodiment, the gaming terminal deducts a rake fee form the Player's "stack" or account balance tracked by the gaming terminal and an indication is sent from the gaming terminal to server 154 via network interface 504, where it is received by processor 500. The selected rake option received by server 154 is then used to record each transaction in a record in memory 502 associated with the player's activities as the game is played. In another embodiment, the rake option selected by the player is provided only to server 154, whereby server 154 deducts the rake fee associated with the rake option selected by the player, and credits an account balance of an authorized gaming establishment where the gaming terminal is located.

Figure 6:
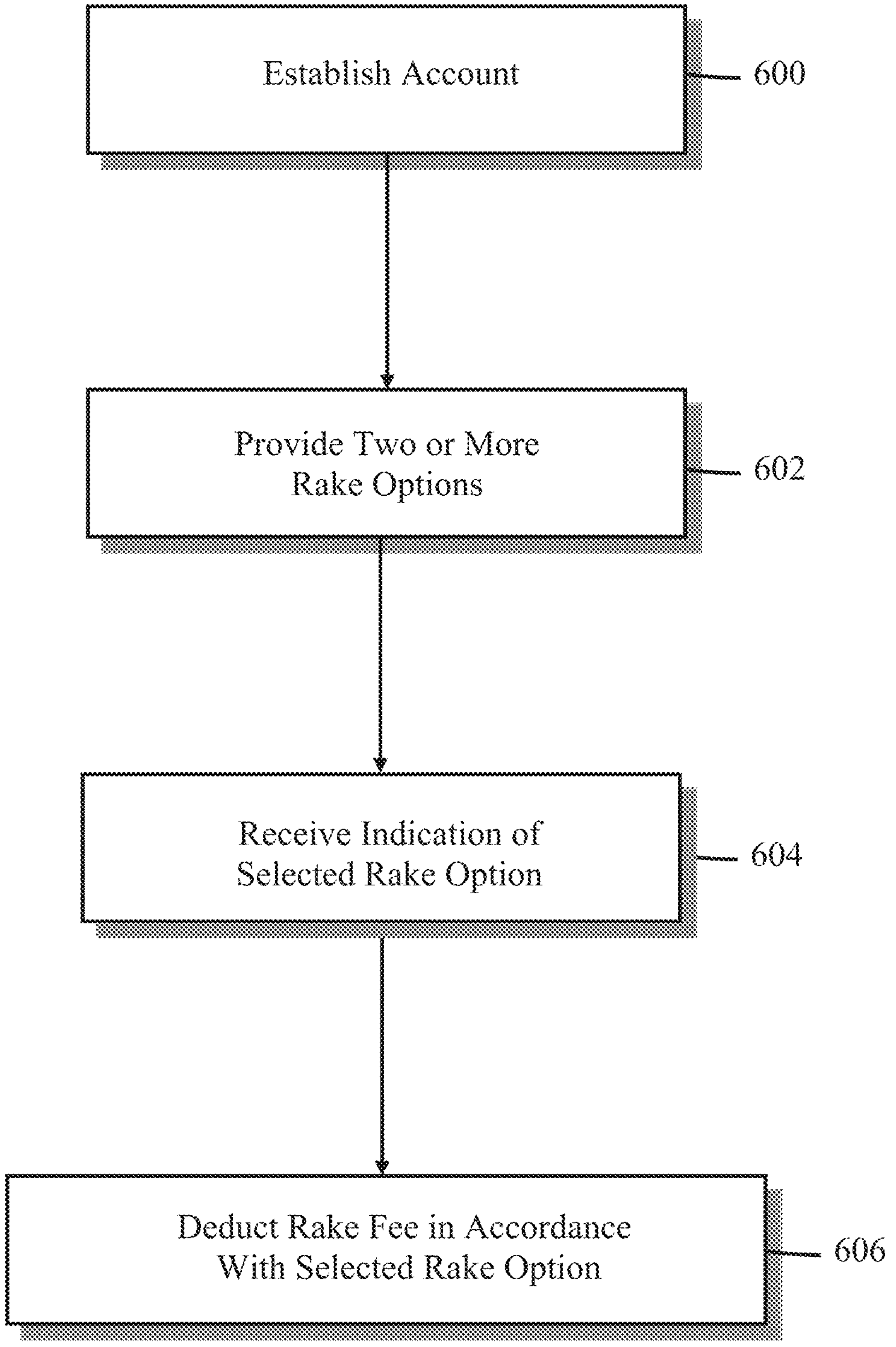
FIG. 6 is a flow diagram illustrating one embodiment of a method for enabling customized gaming to game players.

FIG. 6 is a flow diagram illustrating one embodiment of a method for enabling customized gaming to game players. The method is implemented by a processor, such as processor 300 shown in FIG. 3, located within purview of server 134, 136, and/or 138 (for purposes of the discussion of FIG. 6, herein "local gaming server"), executing processor-readable instructions stored in a memory, such as memory 302 shown in FIG. 3. The local gaming server is electronically coupled to a plurality of gaming terminals, such as the ones shown in FIG. 1. It should be understood that in some embodiments, not all of the steps shown in FIG. 6 are performed and that the order in which the steps are carried out may be different in other embodiments. It should be further understood that some minor method steps have been omitted for purposes of simplicity.

At block 600, the game player establishes an account with either one of the local servers, such as server 134, 136, or 138, or a gaming terminal that the game player is operating. In the case of a local server, the account is typically established with a local server associated with the authorized gaming establishment that the player/gaming terminal is located. The account is used as a source of funds for use in wagering during game play. Typically, a game player will establish an account with one of these entities by providing some form of monetary value to the gaming terminal, such as cash, credit card, debit card, voucher, etc. After funding the account, the gaming terminal or the local server, as the case may be, tracks the account during game play to provide an ongoing account balance.

At block 602, two or more rake options are provided to a first game player operating one of the above-mentioned gaming terminals. In one embodiment, the gaming terminal visually displays the two or more rake options as icons on a display device. Each of the rake options represents a manner in which a rake fee, or "house cut" will be deducted from an account balance associated with the first game player. For example, a first rake option may comprise a predetermined fee that is deducted from the first game player's account balance at predetermined game intervals, such as before and/or after initial card values are provided to players, before and/or after the "flop", before and/or after the "turn", before and/or after the "river", and/or before and/or after the "river". A second rake option may comprise a predetermined fee that is deducted from the player's balance prior to the start of game play or each round of game play. For example, a twenty-five cent rake may be deducted from the player's balance prior to the start of each game of Texas Hold 'Em. Another possible rake option comprises a percentage of the player's wagers placed during the game. In this embodiment, for example, each time the player places a wager, a fixed or variable percentage is deducted from the player's balance as a rake. The maximum rake for each round of play may be limited to a predetermined amount and the percentage of rake may be varied depending on a number of factors, such as pot size, past wagering activity, the betting point in the game (for example, after the flop, before the river, etc.), time of day, and/or other factors. Many other types of rake options may be predefined and offered to potential game players. The rake options may be provided locally at each gaming terminal by processor 300 or by the local gaming server.

The rake options may be continually displayed on a plurality of gaming terminals networked to the local gaming server so that potential players may understand, before selecting a gaming terminal, that such rake options are available. This feature may be an attractive option to potential game players, possibly increasing the number of players who choose to play games having an optional rake feature.

In another embodiment, two or more rake options are displayed after a game player has interacted with a gaming terminal, such as after a player has selected a game type, game stakes, or provided some form of value to the gaming terminal to set up an account balance used for wagering during game play. For example, a game player might choose to sit in front of one of the gaming terminals located inside a casino that allows the player to play real-time games against/with players at other gaming terminals in the same casino. Such games could include any variation of poker, craps, blackjack, keno, bingo, etc. In one embodiment, the gaming terminal provides a choice of games available to the player. In another embodiment, the gaming terminal is configured to offer only one type of game to the player, such as a "dedicated" Texas Hold 'Em gaming terminal. If a choice of games is offered to the player, he or she selects the type of game to be played and provides a form of value, such as cash, credit card, voucher, etc., to the gaming terminal to establish a wagering account. The player may then be provided a selection of virtual gaming tables available for the player to join, or the player may be automatically assigned to a virtual gaming table. The virtual gaming table is a visual representation of a number of individuals playing a game in real-time against/with each other.

In any case, the player, at some point prior to game play, may select one of the two or more rake options shown on the display. In another embodiment, a default rake option applies to selected games, and the player must choose an alternate rake option if he or she so wishes to play games using an alternative rake system. The rake selection by the player typically comprises touching an area of a display on the gaming terminal, which generates an electronic signal that is provided ultimately to processor 300 inside the local gaming server.

Thus, an indication of a selected rake from the two or more rake options is provided to processor 300 at block 604 via network 156, 158, or 160, as the case may be.

After the rake indication has been received by the local gaming server, a rake fee is deducted from the player's account balance, in accordance with the selected rake option, at one or more points during game play, as shown at block 606. This may be performed by the gaming terminal or the local server, as the case may be. For example, if the player has selected a game of Texas Hold 'Em, the player may have selected a rake option whereby a single, fixed rake fee is deducted from the player's account balance prior to the start of each round of play. In this case, the gaming terminal or the local server deducts the fixed rake fee from the player's account balance prior to providing the first two hole cards to the player. The rake fee received from the player is typically credited to an account associated the authorized gaming establishment owning or operating the local gaming server.

It should be understood that each player using the system of FIG. 1 may select their own rake option independent of the other player's rake selection. Thus, in the case of game players assigned to a single, virtual gaming table, the local server may receive an indication from each player of a respective rake option selection, and then deduct a rake fee from each player's account balance as games are played in accordance with the rake option that was selected by each player at the virtual table, respectively.

Figure 7:
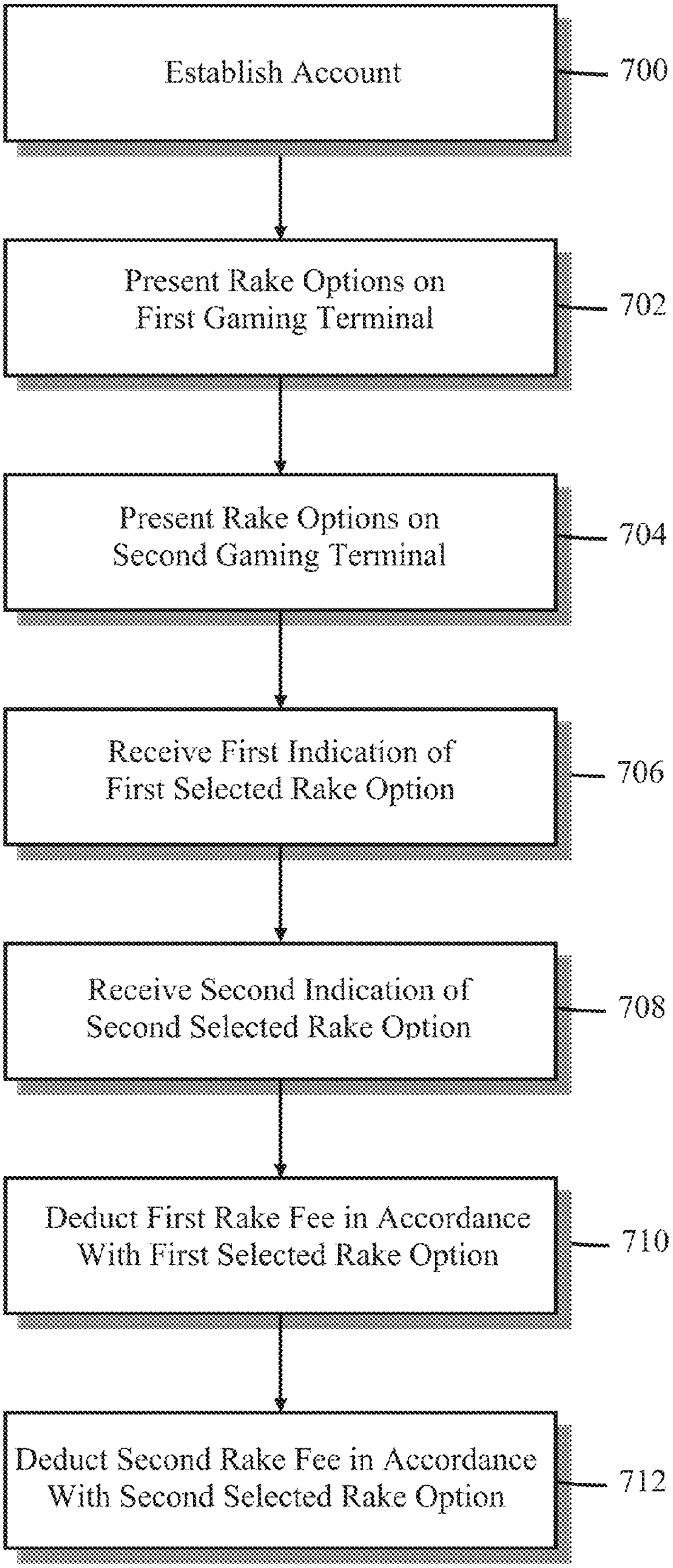
FIG. 7 is a flow diagram illustrating another embodiment of a method for enabling customized gaming to game players.

FIG. 7 is a flow diagram illustrating another embodiment of a method for enabling customized gaming to game players located at two or more authorized gaming establishments, such as two or more players operating respective gaming terminals located in different casinos. The method is implemented by a processor, such as processor 500 shown in FIG. 5, located in server 154, as shown in FIG. 1, executing processor-readable instructions stored in a memory, such as memory 502 shown in FIG. 5. The server is typically electronically coupled to a plurality of gaming terminals distributed between/among two or more authorized gaming establishments, such as the ones shown in FIG. 1 located in, in this embodiment, authorized gaming establishments 106, 108, and 110. Server 154 may be located in any one of the authorized gaming establishments, or it could be placed at some other location, such as a third party management company, web hosting company, etc.

In one embodiment, server 154 is electronically coupled to gaming terminals via intermediate servers, such as servers 134, 136, and/or 138. In another embodiment, server 154 is electronically coupled directly to the gaming terminals. In yet another embodiment, some gaming terminals are electronically coupled directly to server 154, while other gaming terminals are routed through an intermediate server.

It should be understood that in some embodiments, not all of the steps shown in FIG. 7 are performed and that the order in which the steps are carried out may be different in other embodiments. It should be further understood that some minor method steps have been omitted for purposes of clarity.

At block 700, the game player establishes an account with either server 154, one of the local servers, such as server 134, 136, or 138, or a gaming terminal that the game player is operating. In the case of a local server, the account is typically established with a local server associated with the authorized gaming establishment that the player/gaming terminal is located. The account is used as a source of funds for use in wagering during game play. Typically, a game player will establish an account with one of these entities by providing some form of monetary value to the gaming terminal, such as cash, credit card, debit card, voucher, etc. After funding the account, the gaming terminal, local server, or server 154, as the case may be, tracks the account during game play to provide an ongoing account balance.

At block 702, two or more rake options are displayed on a first gaming terminal located at a first authorized gaming establishment. At block 704, two or more rake options are displayed on a second gaming terminal located at a second authorized gaming establishment. The rake options displayed by the first and second gaming terminals may all be different, partially the same, or entirely different from each other. Further, more than just the first and second gaming terminals typically display two or more rake options; typically each gaming terminal configured to offer live play games may offer two or more rake options to players. The rake options may be provided locally at each gaming terminal by processor 300 within the gaming terminal or by a local gaming server, or server 154.

Each of the rake options displayed at each gaming terminal represents a manner in which a rake fee, or "house cut" will be deducted from an account balance associated with each player involved in live game play. For example, a first rake option may comprise a predetermined fee that is deducted from the first game player's account balance at predetermined game intervals, such as before the "flop", before the "turn", and/or before the "river" in a game of Texas Hold 'Em. A second rake option may comprise a predetermined fee that is deducted from the player's balance prior to the start of game play or each round of game play. For example, a twenty-five cent rake may be deducted from the player's balance prior to the start of each game of Blackjack. Another possible rake option comprises a percentage of the player's wagers placed during the game. In this embodiment, for example, each time the player places a wager, a fixed or variable percentage is deducted from the player's balance as a rake. The maximum rake for each round of play may be limited to a predetermined amount and the percentage of rake may be varied depending on a number of factors, such as pot size, past wagering activity, the betting point in the game (for example, after the flop, before the river, etc.), time of day, and/or other factors. Many other types of rake options may be predefined and offered to potential game players.

The rake options may be continually displayed on a plurality of gaming terminals networked to server 154 so that potential players may understand, before selecting a gaming terminal, that such rake options are available. This feature may be an attractive option to potential game players, possibly increasing the number of players who choose to play games with an optional rake feature.

In another embodiment, two or more rake options are displayed after a game player has interacted with a gaming terminal, such as after a player has selected a game type, game stakes, or provided some form of value to the gaming terminal to set up an account balance used for wagering during game play. For example, a game player might choose to sit in front of one of the gaming terminals located inside a casino that allows the player to play real-time games against/with players at other gaming terminals in other authorized casinos. Such games could include any variation of poker, craps, blackjack, keno, bingo, etc. In one embodiment, the gaming terminal provides a choice of games available to the player. In another embodiment, the gaming terminal is configured to offer only one type of game to the player, such as a "dedicated" Texas Hold 'Em gaming terminal. If a choice of games is offered to the player, he or she selects the type of game to be played and provides a form of value, such as cash, credit card, voucher, etc., to the gaming terminal to establish a wagering account. The player may then be provided a selection of virtual gaming tables available for the player to join, or the player may be automatically assigned to a virtual gaming table. The virtual gaming table is a visual representation of a number of individuals playing a game in real-time against/with each other.

In any case, in this example, a first player operating a first gaming terminal located in a first authorized gaming establishment may select one of the two or more rake options shown on the first gaming terminal display. A second player operating a second gaming terminal located in a second authorized gaming establishment may select one of two or more rake options shown on the second gaming terminal display. In another embodiment, a default rake option applies to selected games, and each player must choose an alternate rake option if he or she so wishes to play games using an alternative rake system. The rake selection by each player typically comprises touching an area of a display on each respective gaming terminal, which generates electronic signals that are received by processor 300 inside the gaming terminal, a local server, and/or server 154.

Thus, a first indication of a first selected rake option is received by processor 300 inside the first gaming terminal, a first local server, and/or server 154 from the first gaming terminal at block 706 and a second indication of a second selected rake option is received by processor 300 inside the second gaming terminal, a second local server, and/or server 154 from the second gaming terminal at block 708 via network 162, 164, or 166, as the case may be.

At some point, processor 500 assigns the first player and the second player to a virtual gaming table so that they may play a game against, or with, each other, as well as other players assigned to the virtual gaming table by processor 500.

After the first and second players have been assigned to the virtual gaming table, and the first and second rake indications have been received by the first and second gaming terminals, first and second local servers, and/or server 154, a first rake fee is deducted from the first player's account balance, in accordance with the first player's selected rake option, at one or more points during game play, as shown at block 710. A second rake is deducted from the second player's account balance, in accordance with the second player's selected rake option, also at one or more points during game play, as shown at block 712. As mentioned earlier, the rake options used by the first and second players may be different from each other. For example, the first player may have selected a rake option whereby a single, fixed rake fee is deducted from the first player's account balance prior to the start of each round of play. The second player may have selected a rake option whereby a percentage of the second player's wagering in any round is deducted from the second player's account balance. Thus, at block 710, the fixed rake fee is deducted from the first player's account balance just prior to the beginning of a round of game play, and, at block 712, a percentage of the second player's wagers are deducted from the second player's account balance as game play progresses throughout each round of game play.

In one embodiment, server 154 credits a first account associated with a first authorized gaming establishment where the first game player operates the first gaming terminal in accordance with rake fees deducted from the first player's account balance. Server 154 also credits a second account associated with a second authorized gaming establishment where the second game player operates the second gaming terminal in accordance with rake fees deducted from the second player's account balance.

In another embodiment, server 154 provides game play and game play management to each player, but the local gaming servers track and deduct rake fees from account balances of the players operating respective gaming terminals. In this embodiment, a first player operating a first gaming terminal located at a first authorized gaming establishment may play a live game against a second player operating a second gaming terminal located at a second authorized gaming establishment. In one embodiment, server 154 receives an indication from each player that they would like to play a game and assigns the two players to the same virtual gaming table. Server 154 then proceeds to execute the selected game, providing random game values to the players in accordance with the rules of the selected game. However, the first local gaming server deducts a rake fee from the first player's account balance in accordance with the rake option selected by the first player. The second local gaming server deducts a rake fee from the second player's account balance in accordance with the rake option selected by the second player. Each of the local gaming servers receives game execution information from server 154 and user selection information relating to selections made by the player during game play, such as whether to raise, bet, call, fold, etc., associated gaming terminal in order to determine when and how much rake fees to deduct from a respective player's account balance.

In a related embodiment, either server 154 or a local gaming server provides game play and game play management to players, but gaming terminals themselves track and deduct rakes fees from player account balances. In this embodiment, after an indication of a selected rake option is generated at a gaming terminal, the indication may be provided, in addition or alternatively to server 154 or a local gaming server, to processor 400 inside the gaming terminal. As each round of game play occurs, processor 400 deducts a rake from an account balance associated with a player operating the gaming terminal in accordance with the rake option chosen by the player. Processor 400 typically receives game execution information from server 154 and player selection information via interface 404 as game play occurs in order to determine when and how much rake to deduct from the player's account balance.

In any of the embodiments described above, a "sit out" option may be provided to one or more players during the course of game play. A "sit out" option allows a player to be removed from game play until the player is ready to join game play once again. Typically, there are rules governing how and when a player may re-join game play, such as having to ante a "big blind" or having to wait until a big blind has passed. In one embodiment, an indication is displayed on each gaming terminal that allows a player to sit out one or more rounds of game play. Upon receiving a signal that a player wishes to sit out, the game continues to be played with other game players at a virtual table; however the rake fee that is normally deducted in accordance with a player's selected rake option is also suspended. Thus, no fee is taken from a player's account balance during the time a player sits out.

Figure 8:
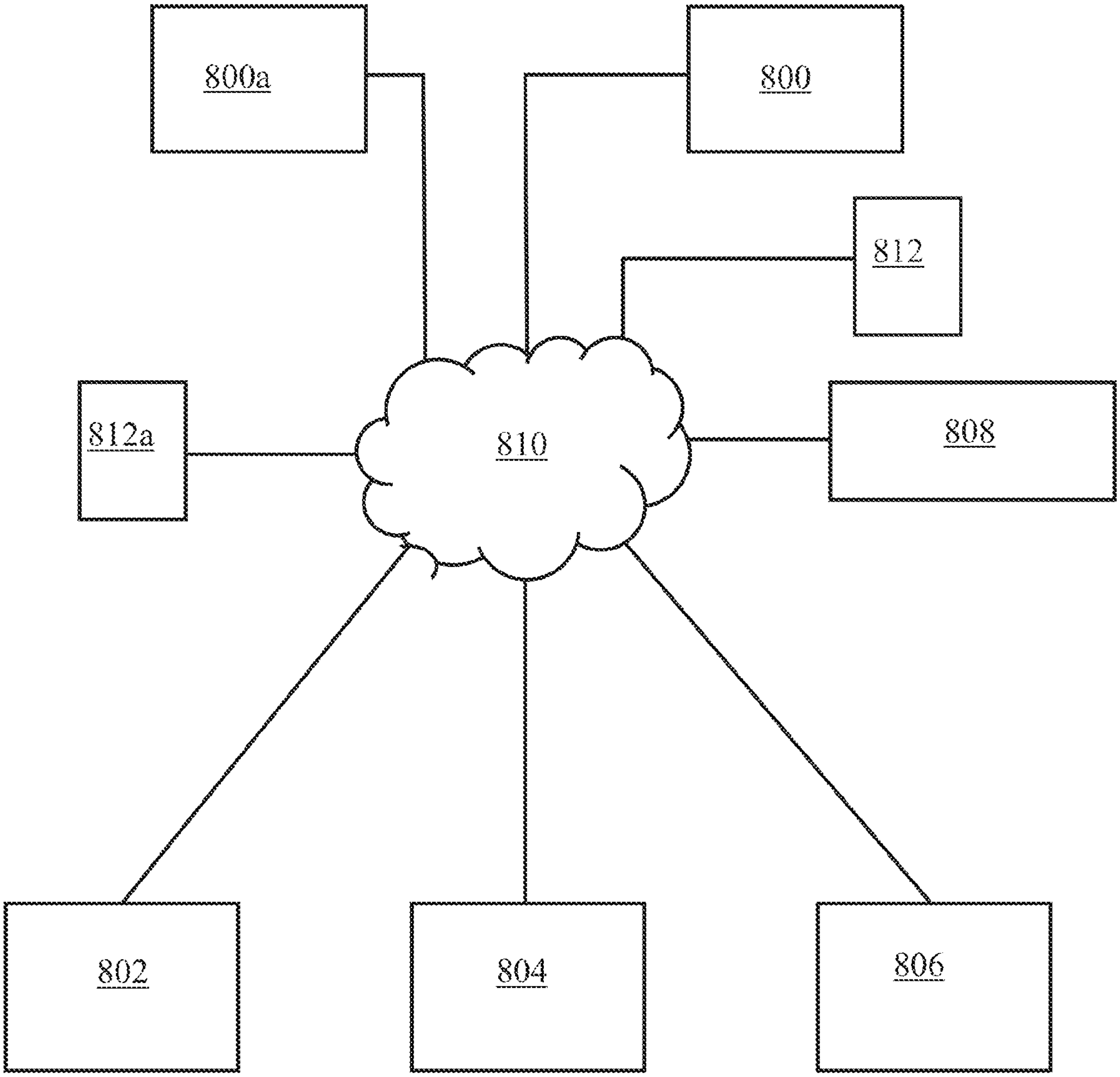
FIG. 8 is a functional illustration of a variation of the gaming system of FIG. 1, introducing an authorized authentication center.

FIG. 8 is a functional block diagram of a variation of the gaming system of FIG. 1, introducing an authorized authentication center 800. In this embodiment, authorized gaming establishments 802, 804, and 806 communicate with central gaming server 808 via network 810 via well-known communication protocols, such as TCP/IP. Authorized gaming establishments 802, 804, and 806 are equivalent to authorized gaming establishments 106, 108, and 110, discussed previously with respect to FIG. 1. Network 810 is equivalent to network 140, also discussed above. Central gaming server 808 acts as a central hosting center for game play among players located at authorized gaming establishments 802, 804, and 806 and one or more authenticated remote game players, for example an individual located at home using a network-enabled electronic device 812 and an individual located at home using network-enabled electronic device 812*a*. Each network-enabled electronic device is equivalent to personal computing device 142, 144, or 146 shown in FIG. 1, comprising one of a computer, tablet computer, smartphone, or the like, as will be discussed in greater detail below. The network-enabled electronic devices communicate with one or both authentication centers 800 and 800*a* via network 810 and/or one or more other communication networks.

Authorized authentication centers 800 and 800*a* are facilities for authenticating individuals who wish to participate in live games offered by central gaming server 808. Authentication is important because it provides a mechanism to ensure that players are actually who they purport to be, and that they meet minimum age requirements often required by federal, state, and/or local regulations. Although FIG. 8 shows only two authorized authentication centers, in practice, almost an unlimited number of authorized authentication centers could exist.

One or more entities may authorize authentication center 800 and 800*a* to provide authentication services on behalf of central gaming server 808, one or more of the authorized gaming establishments, and/or one or more regulatory agencies. Such authorization typically includes a contractual relationship between an authorizing party and the authorized authentication centers, ensuring that each authorized authentication center follows certain minimum authentication procedures determined by central gaming server 808, one or more of the authorized gaming establishments, one or more regulatory agencies, and/or the authorized authentication centers themselves.

Authentication generally comprises an initial "registration" process, where individuals provide authentication credentials to authorized authentication center 800 and/or 800*a*, whereupon authorized authentication center 800 and/or 800*a* creates an authentication record in a memory controlled by authorized authentication center 800 and/or 800*a*. After this initial registration process has occurred, individuals may request to participate in playing live games in a session offered by gaming server 808 by sending authentication information to authorized authentication center 800 or 800*a* via a respective network-enabled electronic device operated by respective individuals, such as fixed or mobile computers, tablet computers, smartphones, or other devices. The authentication information sent by individuals requesting to participate in playing live games in a session to authorized authentication center 800 or 800*a* generally comprises information that may be compared to the authentication information received and stored in memory by authorized authentication center 800 or 800*a* during the initial registration process. If a match is determined between the authentication information stored in the memory and the authentication information received from an individual at the time of request for participation in a live play session, then the requesting individual is granted access to gaming server 808 so that the individual may participate in live game play with players located at authorized gaming establishments, e.g., authorized gaming establishments 802, 804, and 806, and/or other authenticated game participants not located at an authorized gaming establishment, but participate at non-gaming locations by virtue of being authenticated by an authorized authentication center.

Authorized authentication center 800 and/or 800*a* may comprise an authorized gaming establishment similar to authorized gaming establishments 802, 804, and 806. However, authorized authentication center 800 and/or 800*a* may be located a great distance from these establishments, for example, in another county, state, or even another country.

In other embodiments, authorized authentication center 800 and/or 800*a* comprises a non-gaming establishment that provides authentication services on behalf of central gaming server 808. In this example, authorized authentication center 800 and/or 800*a* may comprise a service center where individuals can visit and present any required authentication information to an authorized authentication center representative, or, in other embodiments, a self-serve kiosk having the capability to query, receive, and store authentication information provided by individuals. Individuals may be required to provide identification, such as a driver's license or passport, and/or other kinds of authentication information such as a visual image of an individual's face, a voice sample, one or more fingerprints, a palm print or scan of one or moth palms, an image of a body part, such as of an individual's retina, and/or other information that may be used to authenticate the individual in subsequent interactions with authorized authentication center 800 and/or 800*a*.

Figure 9:
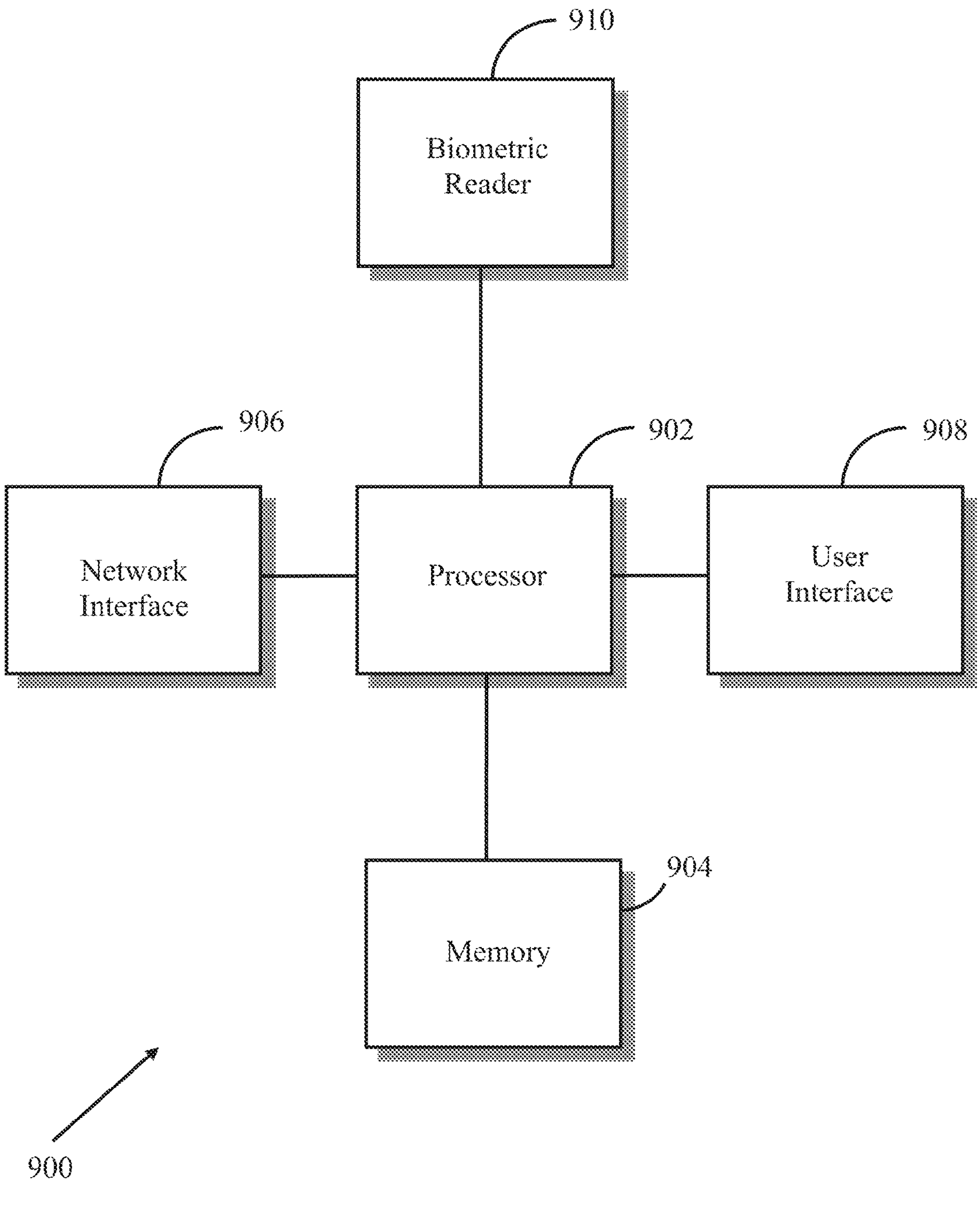
FIG. 9 is a functional block diagram of one embodiment of an authentication server located at an authorized authentication center.

FIG. 9 is a functional block diagram of one embodiment of an authentication server 900 located at authorized authentication center 800 or 800*a*. Authentication server 900 typically comprises a processor 902, a memory 904, a network interface 906, a user interface 908, and a biometric reader 910. The authentication sever 900 may take the form of a computer, application server, web server, or other electronic device that allows registration of remote players and authentication services for individuals requesting to play live games offered by central gaming server 808. It should be understood, however, that in other embodiments, registration could be provided by one set of hardware/software/firmware, while authentication could be provided by another set of hardware/software/firmware, each set of hardware/software/firmware located nearby one another or not.

Processor 902 comprises a general-purpose microprocessor well known in the art or it may comprise a custom or semi-custom ASIC able to carry out the functionality required for game play. Processor 902 generally executes processor-executable instructions stored in one or more mediums, such as memory 904, that control most or all of the functionality of the server. Examples of memory 904 include one or more electronic memories such as RAM, ROM, hard drives, flash memory, EEPROMs, EPROMs, etc.

Network interface 906 comprises hardware and/or software configured to receive and process electronic communications from one or more communication networks, such as the Internet, a fiber optic network, a radio network, a wired or wireless telephone network, a satellite network, a wired or wireless data network, and/or any other well-known, two-way communication networks. The communications comprise requests from persons using a network-enabled electronic device, such a desktop or laptop computer, tablet computer, smartphone, etc., connected to network 810, to participate in games offered by central gaming server 808. The communications could also comprise network traffic related to game play as a participant of the gaming network managed by central gaming server 808.

User interface 908 generally comprises hardware and/or software necessary for allowing a user, such as a customer service representative, who has authority to create authentication records on behalf of individuals wishing to participate in games offered by central gaming server 808. User interface 908 may also allow individuals to create authentication records for themselves without the use of a customer service representative in certain circumstances. In other embodiments, user interface 908 comprises a personal electronic device, such as a smartphone or tablet computer, used by a person to provide authentication information to authentication server 900. In those embodiments, the personal electronic device may comprise a camera, fingerprint reader, palm reader, retinal scanner, microphone, etc., allowing authentication information of the person seeking registration to provide such information to authentication server 900.

User interface 908 typically comprises a keyboard, keypad, push-buttons, switches, a video display, a touch-screen device, a card reader, a microphone, an image capture device such as a still camera or video camera, a speaker, an RS-232 port, a USB port, a network port, and/or virtually any other device that allows a person to provide information to, or receive information from, processor 902.

Biometric reader 910 comprises an electronic device capable of capturing physical traits of people. Typically, these traits are captured and then converted into one or more digital formats. Biometric reader 910 may comprise one or more of a camera, an audio capture mechanism such as a microphone, a fingerprint scanner, palm scanner, a retinal scanner, or any other device to capture a physical human trait. Biometric reader 910 provides electronic representations of traits to processor 902, where the representations may be further processed, or simply stored in an authentication record.

Figure 10:
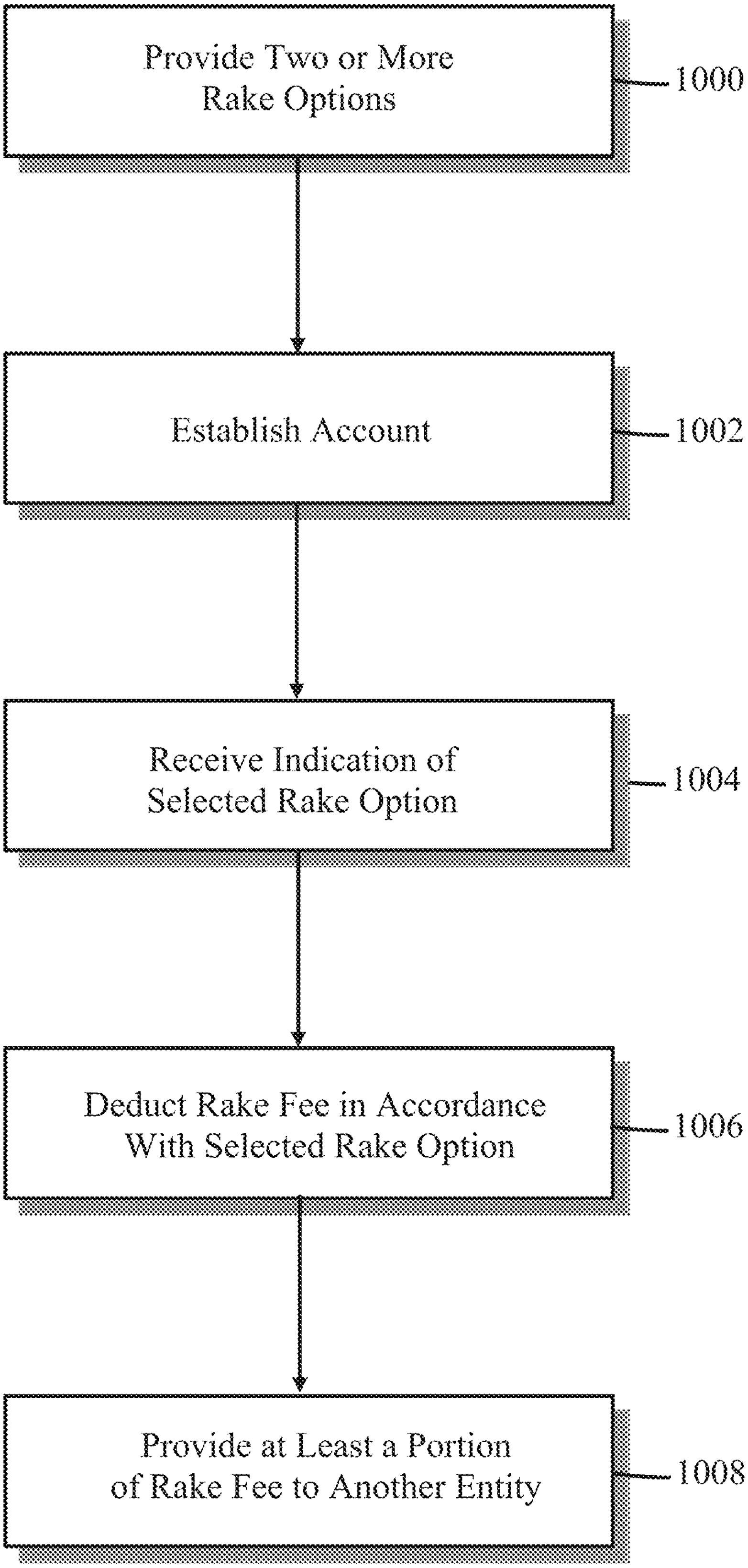
FIG. 10 is a flow diagram illustrating another embodiment of a method for enabling customized gaming to game players located remotely from the central gaming server 154 in FIG. 1.

FIG. 10 is a flow diagram illustrating another embodiment of a method for enabling customized gaming to game players located remotely from gaming server 154, such as players operating devices such as network-enabled electronic device 812 and 812*a* (which may be referred to as gaming terminals when executing software that allows game play). The method is implemented by a processor, such as processor 500 shown in FIG. 5, located in server 154, as shown in FIG. 1, executing processor-readable instructions stored in a memory, such as memory 502 shown in FIG. 5. The server is typically electronically coupled to a plurality of network-enabled electronic devices, such as network-enabled electronic devices 812 and 812*a* and, typically, server 154.

In one embodiment, server 154 is electronically coupled to other gaming devices, such as gaming terminals 112, 118, and 126 via intermediate servers, such as servers 134, 136, and/or 138. In another embodiment, server 154 is electronically coupled directly to gaming terminals. In yet another embodiment, some gaming terminals are electronically coupled directly to server 154, while other gaming terminals are routed through an intermediate server.

It should be understood that in some embodiments, not all of the steps shown in FIG. 10 are performed and that the order in which the steps are carried out may be different in other embodiments. It should be further understood that some minor method steps have been omitted for purposes of clarity.

At block 1000, two or more rake options are provided to a first game player operating, for instance, network-enabled electronic device 812. In one embodiment, the gaming terminal visually displays the two or more rake options as icons on a display device. Each of the rake options represents a manner in which a rake fee, or "house cut" will be deducted from an account balance associated with the first game player, as explained above with reference to the method shown in FIG. 6. The rake options may be generated locally by software that is downloaded to network-enabled electronic devices 812 prior to game play or it may be provided by server 154 as an-ongoing interaction between network-enabled electronic device 812 and server 154.

At block 1002, the game player establishes an account with either server 154 or, for example, authentication center 800. The account is used as a source of funds for use in wagering during game play. Typically, a game player will establish an account with either server 154 and/or authentication center 800 on a one-time basis, and fund the account using any number of known and convenient funding mechanisms, such as a credit or debit card transfer, bank wire or other bank transfer, etc. After funding the account, server 154 or authentication center 800, as the case may be, tracks the account during game play to determine an ongoing account balance.

At block 1004, the game player selects one of the two or more rake options displayed by network-enabled electronic device 812, and an indication of his/her selection is sent to server 154, authentication center 800, or both, depending on how the system is configured. For example, when a player wishes to participate in live game play offered by server 154, the player might visit a website offered by authentication center 800, where the player logs into his/her account. If the login is successful, the player is provided access to server 154 either through the website offered by authentication center 800 or directly to server 154. In this configuration, the rake option indication is sent to authentication center 800, where it may then be provided to server 154 from authentication center 800. In another configuration, a player wishing to participate in live game play offered by server 154 might visit a website offered by server 154, where the player might be invited to supply his/her login credentials to server 154. Server 154, in response, forwards the credentials to authentication center 800, where the credentials are verified. If the player is successfully verified by authentication center 800, a message is sent back to server 154, whereupon server 154 permits the player access to games offered by server 154. In this scenario, the rake option indication is sent to server 154, where it may also be provided to authentication center 800 by server 154. Other configurations are, of course, possible, as one skilled in the art would understand.

In one embodiment, a default rake option applies to selected games, and the game player must choose an alternate rake option if he or she so wishes to play games using an alternative rake system. The rake selection by the game player typically comprises touching an area of a display on network-enabled electronic device 812, which generates an electronic signal that is provided either to server 154, authentication center 800, or both.

After the rake indication has been received by server 154, authentication center 800, or both at block 1004, a rake fee is deducted from the player's account balance, in accordance with the selected rake option, at one or more points during game play, as shown at block 1006. For example, if the player has selected a game of Texas Hold 'Em, the player may have selected a rake option whereby a single, fixed rake fee is deducted from the player's account balance prior to the start of each round of play. In one embodiment, server 154 deducts the fixed rake fee from the player's account balance. In another embodiment, authentication center 800 deducts the rake fee from the player's account balance. The rake fee received from the player may be credited to an account associated with an owner/operator of server 154, an authorized gaming center, and/or authentication center 800.

At block 1008, in one embodiment, at least a portion of the rake fee deducted from the player's account balance is provided from one entity to another. For example, in an embodiment where the rake fee is deducted from the player's account balance by server 154, server 154 may credit authentication center 800 at least a portion of the rake fee, in exchange for having providing initial registration services to the player. In another embodiment where the rake fee is deducted from the player's account balance by authentication center 800, authentication center 800 may credit server 154 with at least a portion of the rake fee, in exchange for server 154 providing the game to the player.

As explained above with respect to the method described in FIG. 6, it should be understood that each remote game player using the gaming system of FIG. 8 may select their own rake option independent of the other game player's rake selection. Thus, in one embodiment, a first game player authenticated by authentication center 812 may play a game against a second game player authenticated by authentication center 812*a*. The first game player may select a first rake option from two or more available rake options, while the second game player may select a different rake option from the same or different rake options provided to the first game player. Then, as games are played, server 154 deducts rake fees from both players in accordance with their respective, selected rake options, and, in one embodiment, provides a credit to each of the authentication centers with respect to the first and second game players, respectively. In another embodiment, the rake fees are credited to an account associated with server 154, or some other entity, such as an authorized gaming establishment that operates/owns server 154.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a gaming terminal. In the alternative, the processor and the storage medium may reside as discrete components.

Accordingly, an embodiment of the invention may comprise a non-transitory processor-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A method for enabling customized gaming to game players, comprising:

providing, by one or more processors, a selection of two or more rake options to a first game player playing a first game via a first gaming terminal, wherein a first rake option comprises a predetermined fee that is deducted from an account balance associated with a player at predetermined game intervals and a second rake option comprises a predetermined fee that is deducted from the account balance associated with the player prior to the start of game play;

receiving an indication, by the one or more processors, of a selected rake option from the two or more rake options for use during the course of game play by the first game player; and deducting the predetermined fee, by the one or more processors, from an account balance associated with the first game player in accordance with the rake option selected by the first game player.

2. The method of claim 1, wherein providing the two or more rake options to the first game player occurs before the start of each round of game play, and deducting the predetermined fee from the account balance in each round of game play occurs in accordance with the rake option selected prior to the start of each round of game play.

3. The method of claim 1, further comprising:

providing an option, by the one or more processors, to the first game player to sit out during at least one round of game play;

receiving a second indication from the first game player to sit out;

executing the game without including the first game player in game play; and suspending deducting the fee associated with the selected rake option during the time period that the first game player sits out.

4. The method of claim 1, further comprising:

providing the two or more rake options, by the one or more processors, to a second game player operating a second gaming terminal;

receiving a second indication of a second rake option from the second game player; and deducting the predetermined fee from a second account balance associated with the second game player in accordance with the second rake option selected by the second game player.

5. The method of claim 4, wherein the first game player and the second game player play at least against each other.

6. The method of claim 4, wherein the two or more rake options provided to the first game player are different than the two or more rake options provided to the second game player.

7. The method of claim 1, wherein at least a portion of the fee is credited to an authentication center associated with the first game player by the processor.

8. The method of claim 1, wherein one of the two or more rake options comprises:

a percentage of the player's wagers placed during game play that is deducted from the account balance associated with player.

9. A server for providing network-based gaming to a plurality of gaming terminals, and for enabling customized gaming to game players using the gaming terminals, comprising:

a network interface for receiving rake option selections from gaming terminals;

a memory for storing information related to two or more rake options related to a first game and for storing processor-executable instructions, a first rake option comprising a predetermined fee that is deducted from an account balance associated with a player at predetermined game intervals and a second rake option comprising a predetermined fee that is deducted from the account balance associated with the player prior to the start of game play;

a processor connected to the network interface and the memory for executing the processor-executable instructions that cause the server to:

provide the two or more rake options to the plurality of gaming terminals in association with the first game;

receive a first rake option selection from the first gaming terminal; and deduct the predetermined fee from an account balance associated with the first game player operating the first gaming terminal in accordance with the first rake option selection.

10. The server of claim 9, wherein the processor-executable instructions further comprise instructions to: receive a second rake option selection from a second game player;

deduct the predetermined fee from a second account balance associated with the second player in accordance with the second rake option selection.

11. The server of claim 10, wherein the first game player and the second game player play against at least each other.

12. The server of claim 10, wherein the first rake selection and the second rake selection are different from one another.

13. The server of claim 9, wherein one of the two or more rake options comprises:

a percentage of the player's wagers placed during game play that is deducted from the account balance associated with the player.

14. The server of claim 9, wherein the processor-executable instructions further comprise instructions that cause the server to credit an authentication center at least a portion of the deducted predetermined fee.

15. A gaming terminal configured for allowing customized gaming to a first game player using the gaming terminal, comprising:

a memory for storing processor-executable instructions;

a user interface for providing information to the first game player and for receiving indications from the first game player; and a processor coupled to the memory and the user interface for executing the processor-executable instructions that cause the gaming terminal to:

provide two or more rake options to the user interface during play of a first game by the first game player, a first rake option comprising a predetermined fee that is deducted from an account balance associated with a player at predetermined game intervals and a second rake option comprising a predetermined fee that is deducted from the account balance associated with the player prior to the start of game play;

receive an indication of a selected rake option from the two or more rake options for use during the course of game play by the first game player; and deduct the predetermined fee from an account balance of the first game player in accordance with the rake option selected by the first game player.

16. The gaming terminal of claim 15, wherein one of the two or more rake options comprises:

a percentage of the player's wagers placed during game play that is deducted from the account balance associated with player.

17. The gaming terminal of claim 15, further comprising:

a network interface for allowing the first game player to play the first game against a second game player, wherein an account balance of the second game player is reduced in accordance with a rake option selection different than what was selected by the first game player.

18. The gaming terminal of claim 15, wherein the processor-executable instructions further comprise instructions that causes the gaming terminal to:

receive game execution information from a central gaming server related to game play;

receive user selection information from the user interface during game play; and deducting the predetermined fee from the account balance of the first player in accordance with the selected rake option, the game execution information, and the user selection information.

19. The gaming terminal of claim 15, wherein the processor-executable instructions further comprise instructions that cause the server to credit an authentication center at least a portion of the deducted predetermined fee.

20. A method for enabling customized gaming to game players, comprising:

providing, by one or more processors, a selection of two or more rake options to a first game player playing a first game via a first gaming terminal, a first rake option comprising a predetermined fee that is deducted from an account balance associated with a player at predetermined game intervals and a second rake option comprising a percentage of the player's wagers placed during game play that is deducted from the account balance associated with the player;

receiving, by the one or more processors, an indication of a selected rake option from the two or more rake options for use during the course of game play by the first game player; and deducting the predetermined fee, by the one or more processors, from an account balance associated with the first game player in accordance with the rake option selected by the first game player.

21. The method of claim 20, further comprising:

providing the two or more rake options to a second game player operating a second gaming terminal;

receiving a second indication of a second rake option from the second game player; and deducting the predetermined fee from a second account balance associated with the second game player in accordance with the second rake option selected by the second game player.

22. The method of claim 21, wherein the first game player and the second game player play at least against each other.

23. The method of claim 21, wherein the two or more rake options provided to the first game player are different than the two or more rake options provided to the second game player.

24. The method of claim 20, wherein one of the two or more rake options comprises:

a predetermined fee that is deducted from the account balance associated with the player prior to the start of game play.

25. A method for enabling customized gaming to game players, comprising:

providing, by one or more processors, a selection of two or more rake options to a first game player playing a first game via a first gaming terminal, a first rake option comprising a predetermined fee that is deducted from an account balance associated with the a player prior to the start of game play and a second rake option comprising a percentage of the player's wagers placed during game play that is deducted from the account balance associated with the player;

receiving, by the one or more processors, an indication of a selected rake option from the two or more rake options for use during the course of game play by the first game player; and deducting the predetermined fee, by the one or more processors, from an account balance associated with the first game player in accordance with the rake option selected by the first game player.

26. The method of claim 25, further comprising:

providing the two or more rake options to a second game player operating a second gaming terminal;

receiving a second indication of a second rake option from the second game player; and deducting the predetermined fee from a second account balance associated with the second game player in accordance with the second rake option selected by the second game player.

27. The method of claim 26, wherein the first game player and the second game player play at least against each other.

28. The method of claim 26, wherein the two or more rake options provided to the first game player are different than the two or more rake options provided to the second game player.

* * * * *